United States Patent [19]

Nakano et al.

[11] Patent Number: 4,683,003
[45] Date of Patent: Jul. 28, 1987

[54] PROCESS FOR PRODUCTION OF CELLULAR CONCRETE

[75] Inventors: Sota Nakano, Tokyo; Masaaki Ozawa, Niiza, both of Japan

[73] Assignee: Misawa Home Kabushiki Kaisha, Tokyo, Japan

[21] Appl. No.: 723,253

[22] Filed: Apr. 15, 1985

[30] Foreign Application Priority Data

Jul. 30, 1984 [JP] Japan ................... 59-159958

[51] Int. Cl.$^4$ ............................................. C04B 7/02
[52] U.S. Cl. ........................................ 106/86; 106/88; 106/315; 106/90
[58] Field of Search ............ 106/86, 88, 315, 314, 106/90

[56] References Cited

U.S. PATENT DOCUMENTS 4,028,125  6/1977  Martin .................. 106/315
4,036,659  7/1977  Stude ................... 106/315
4,082,561  4/1978  Nakagawa et al. ........ 106/315

FOREIGN PATENT DOCUMENTS 783129  9/1957  United Kingdom ........ 106/89

*Primary Examiner*—William R. Dixon, Jr.
*Assistant Examiner*—Steven Capella
*Attorney, Agent, or Firm*—Robert E. Burns; Emmanuel J. Lobato

[57] ABSTRACT

A process for producing cellular concrete articles in the so-called pre-foam fashion, comprises molding a mixture (D) of a cement compound slurry (A) comprising calcium silicate and a rapid-hardening cement compound slurry (B) comprising calcium aluminate and an aqueous foamed liquid (C), and subjecting the molded article to hydrothermal curing, both the slurries (A) and (B) containing specified certain cement-setting retarders, respectively. By the synergistic effect of these two different retarders, an exotherm dwell period is provided in the initial setting stage of the foamed mixture (D).

9 Claims, 1 Drawing Figure

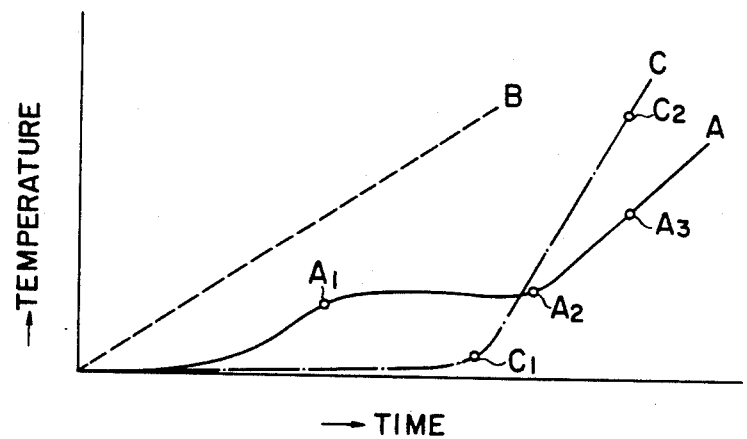

PROCESS FOR PRODUCTION OF CELLULAR CONCRETE

BACKGROUND OF THE INVENTION

1. Field of the Art

This invention relates to a process for production of cellular concrete by the so-called pre-foam technique by using a slurry of a rapid-hardening cement compound. More particularly, the invention relates to a process for producing the cellular concrete characterized by the means for controlling the setting of the foamed or aerated slurry of the rapid-hardening cement compound.

Cellular concrete has been the focus of much attention because it affords reductions in weight and cost in concrete structures. Prefabrication of concrete products has been developed, and a variety of cellular concrete panels have come into use.

Such cellular concrete is represented by autoclaved light-weight concrete (hereinafter referred to as ALC). ALC has a large market for use in stable building materials and is essentially light-weight concrete comprised of crystalline calcium silicate hydrate of tobermorite species which has been produced by aging set prefoamed products in an autoclave under pressurized hydrothermal conditions.

The ALC now produced on an industrial scale can be classified into the so-called post-foam type and prefoam type. The former post-foam process is carried out by introducing a hydraulic cement compound slurry into a mold and foaming it with hydrogen gas generated from the reaction of aluminum powder added into the cement compound with an alkali component such as cement or lime. According to this process, the height of the foam produced in a mold is limited to about 60 cm in order to secure uniformity of foaming conditions of upright direction in view of the static pressure of the cement compound slurry under foaming in the mold. Thus, in order to increase the efficiency in the use of costly molds, panels or slabs (before curing) of 60-cm width due to the above mentioned height of the foamed product are produced by slicing the resulting foamed products vertically to a predetermined thickness.

As is clear from the above described procedure, the conventional cellular concrete panels of the post-foam type are not satisfactory with respect to large-sized products, complicated shapes and designs, etc.

Such problems can be substantially solved by the so-called pre-foam process wherein foam is introduced into a hydraulic cement compound slurry and then the foamed slurry is poured into a mold. In this case, however, one mold is used for each panel or slab. Thus, it is essential to shorten the time between pouring and demolding by causing rapid setting of the cement compound slurry in order to increase the efficiency in use of the costly mold. On the other hand, it is necessary (i) to prevent such phenomena as local setting of the cement slurry in the mold in the procedure between pouring and demolding, segregation of high-density components, and defoaming, and (ii) to carry out surface treatment such as scraping or leveling of protuberant portions over the mold, planing of the surface, or stamping design patterns. Thus, it is also essential that the cement slurry under setting have suitable consistency for a period necessary for such surface treatment.

2. Prior Art

From this point of view, a possible measure which may be considered is the incorporation of a setting retardant or retarder into the rapid-hardening cement compound slurry.

A variety of the setting retarders have been proposed for such cement compound slurry. The conventional retarders, however, are not suitable for the above mentioned purpose, because the patterns of their setting retardation are not suitable.

More specifically, the figure in the attached drawing shows the exothermic conditions of hydraulic cement compound slurries under their hydration reactions with elapse of time. In the drawing, the vertical axis indicates the degree of setting or strength because the exotherm is generally correlated with the degree of setting. To the best of our knowledge, the conventional setting retarders exhibit the pattern of the curve C.

In the drawing, the curve B shows the pattern of a cement slurry which contains no retarder, wherein the setting proceeds progressively with elapse of time. The cement slurry shown by the curve B is advantageous with respect to the segregation of high-density components in the slurry and the escape of the introduced foam because its consistency reaches a desirable level rather rapidly but is inferior in the workability or reproducibility of the pouring and the above mentioned surface treatment because its setting passes rather rapidly over the level or region of consistency necessary for the pouring and surface treatment.

The curve C shows the case where a setting retarder is used. The setting pattern as shown by the curve C has good workability for the pouring into the mold because the setting reaction is strongly restricted for some period of time. In this restricted stage, however, the surface treatment is not possible, and also the segregation of high-density components is unavoidable because sufficient consistency is not yet obtained. After termination of the setting restriction, there are also raised the same problems as in the case of curve B.

The curve A shows a setting pattern wherein a level of consistency ($A_1$) is exhibited and the condition of such consistency level is maintained ($A_1 \rightarrow A_2$) for some period of time. A setting pattern wherein the period between $A_1$ and $A_2$ is amply long can be said to be an ideal pattern because the above mentioned surface treatment becomes possible.

To the best of our knowledge, however, there is no setting retarder which exhibits such an ideal pattern. Conventional retarders generally produce the curve B or the curve A wherein the period between $A_1$ and $A_2$ is very short. Conventional setting retarders exhibiting such patterns are exemplified by an alkali metal salt of citric acid or tartaric acid as well as a combination of an alkali metal carbonate and citric acid or tartaric acid.

SUMMARY OF THE INVENTION

As a result of our research on molding cellular concrete from a prefoam-type rapid-hardening cement compound, the present invention was conceived and developed to meet the need of controlling setting retardation patterns to exhibit the pattern shown in the curve A of the attached drawing. The present invention is based on the synergism between two setting retarders used in combination.

According to this invention there is provided a process for production of cellular concrete which comprises mixing an aqueous slurry (A) of a cement compound containing calcium silicate as a main hydraulic mineral component, an aqueous slurry (B) of a rapid-hardening cement compound containing calcium aluminate as a main hydraulic mineral component, and an aqueous foamed liquid (C) to prepare a foamed slurry (D) of a rapid-hardening cement compound, molding the slurry (D) and then subjecting the resulting molded article to high-temperature and high-pressure hydrothermal curing, characterized in that a cement-setting retarder (a) consisting essentially of an alkali metal salt of a hydroxycarboxylic acid is dissolved in the slurry (A), and a cement-setting retarder (b) consisting essentially of a combination of (i) a hydroxycarboxylic acid or an alkali metal salt thereof with (ii) an alkali metal salt of an inorganic weak acid is dissolved in the slurry (B), whereby an exotherm-dwell period is provided in the initial setting stage of the foamed slurry (D) of the rapid-hardening cement compound.

In the present invention, the combination of setting retarders (a) and (b) is employed as mentioned above, and the resulting setting retardation pattern is shown by the curve A. The setting retarder (a) or (b) is known and exhibits a setting retardation pattern as shown by the curve C or by the curve A wherein $A_1$ and $A_2$ closely approach each other as described above. Thus, the quite unexpected result of the setting retardation pattern as shown by the curve A can be obtained by the combined use of the retarders (a) and (b) as a result of a synergistic effect.

According to the present invention, a setting retardation pattern as shown by the curve A can be obtained, and thus all of the problems occurring in such setting retardation patterns as shown by the curve B or C are solved because some hydration reaction proceeds, and the consistency of the cement slurry reaches a desirable level, after which the level is maintained for a desirable period.

BRIEF DESCRIPTION OF THE DRAWING

In the attached drawing, the single FIGURE is a graph showing exotherm curves of various foamed slurries of hydraulic cement compounds, wherein:

Curve A is an exotherm curve having an exotherm-dwell period according to the present invention;

Curve B is an exotherm curve in the case where setting is not controlled; and

Curve C is an exotherm curve in the case where a conventional setting retarder is used.

DETAILED DESCRIPTION OF THE INVENTION

Foamed Rapid-Hardening Cement Compound Slurry (D)

The foamed slurry (D) of the rapid-hardening cement compound the setting of which is to be controlled according to the present invention, comprises components (A), (B), and (C). The term "foamed slurry (D) of the rapid-hardening cement compound" used herein means such a slurry in which are admixed setting retarders. In this paragraph, however, it refers to a slurry which does not yet contain the setting retarders for the convenience of explanation. The components (A) through (D) are known.

Aqueous slurry (A)

The aqueous slurry (A) is an aqueous slurry of a cement compound containing calcium silicate as a main hydraulic mineral component.

This cement compound is a component for producing a crystalline calcium silicate hydrate of tobermorite species through high-temperature and high-pressure hydrothermal curing, the details of which are well known with respect to the conventional ALC.

This compound contains CaO and $SiO_2$ as main components preferably in a weight ratio of from about 5:5 to about 2:8. The aqueous slurry (A) can be obtained by mixing fine powder of cement materials (such as portland cement), CaO, silica, etc. in such a ratio as to obtain the above mentioned CaO to $SiO_2$ ratio in accordance with the purpose, and then dispersing the resulting mixture in water.

To this aqueous slurry (A), calcium sulfate, lime and the like can be added for the purpose of adjusting the setting speed thereof. Of course, sand, perlite powder and other aggregates, reinforcing fiber materials, coloring pigments, etc., also can be added thereto. The concentration of the slurry is approximately 60 to 75% by weight on a total solid basis.

The material referred to as "the cement compound" with regard to the aqueous slurry (A) (as well as the aqueous slurries (B) and (C)) in the present invention includes not only cement compositions containing in addition to cement silica, CaO, sand and other components but also cement alone.

Aqueous slurry (B)

The aqueous slurry (B) is an aqueous slurry of a rapid hardening cement compound containing calcium aluminate as a main hydraulic mineral.

This cement compound consists essentially, in its chemical composition, of minerals selected from $C_{12}A_7$, CA, $CA_2$, $C_3A$, $C_2AS$, $C_4AF$, $C_{11}A_7CaF_2$, $C_3A_3CaF_2$, $C_3A_3CaSO_4$, etc. (wherein C denotes CaO, A denotes $Al_2O_3$ and S denotes $SiO_2$).

This cement compound is exemplified by alumina cement and CSA (calcium sulfoaluminate).

The concentration of the slurry is approximately 50 to 70% by weight based on the total solid content.

Aqueous foamed liquid (C)

Aqueous foamed liquid used in a prefoam method is also known. Any of such liquids can be used in the present invention provided that it is suitable.

Aqueous foamed liquid is usually obtained by foaming an aqueous solution of a foaming agent through stirring, blowing or the like. The foaming agent desirably has excellent stability, anionic synthetic surface active agents, protein decomposition product—based foaming agents, and the like being used.

A suitable aqueous foamed liquid has an apparent specific gravity of the order of 0.01 to 0.20.

Foamed slurry (D)

The foamed slurry (D) of rapid-hardening cement compound to be cast is a mixture of the above described components (A), (B), and (C) (and setting retarders).

The amount of each component may be arbitrarily determined as long as it is reasonable. In general, however, the aqueous slurry (B) is usually used in such an amount that the main hydraulic mineral component thereof amounts to approximately 3 to 30% by weight of that of the aqueous slurry (A). The amount of the aqueous foamed liquid (C) is suitably chosen so that a prescribed foamed state (specific gravity) can be obtained.

The foamed slurry (D) should be produced by preparing at least the aqueous slurries (A) and (B) separatly and then mixing them. However, the ordinary and preferable method is to form the slurry (D) by separately preparing the slurries (A), (B) and (C) and then mixing them. In the latter case, it is possible to afford a time delay in the contacting of the three components.

The water content of the foamed slurry (D) is of the order of 45 to 70% by weight of the total amount of the compounds (solid contents) of the aqueous slurries (A) and (B). The water in the slurry (D) ordinarily comes from the components (A), (B) and (C). The distribution ratio of the water among the components (A), (B) and (C) is determined with consideration of workability.

The specific gravity of the foamed slurry (D) is determined by the amount of the aqueous foamed liquid (C) added as well as the degree of escape of the foam after the addition thereof. On the other hand, the specific gravity of the cellular concrete product is determined by the specific gravity of the foamed slurry (D).

SETTING RETARDERS

General views

The most important feature of the present invention resides in the combined use of two types of setting retarders, namely, (a) an alkali metal salt of a hydroxycarboxylic acid and (b) a combination of (i) a hydroxycarboxylic acid and (ii) an alkali metal salt of an inorganic weak acid.

The two types of setting retarders are used to control the reactivity of the aqueous slurry (A) or (B) itself and that between these slurries. More specifically, one of the setting retarders, retarder (a), is dissolved in the aqueous slurry (A) to control the reactivity of the slurry (A) itself and to provide the slurry (A) with a setting-inhibition capability in the presence of the aluminate ion contained in the aqueous slurry (B) when the slurry (A) is mixed with the slurry (B). On the other hand, the other setting retarder (b) is dissolved in the aqueous slurry (B) to restrict the reactivity of the slurry (B) itself and to inhibit setting owing to the reaction between the components in the slurries (A) and (B) when the slurry (B) is mixed with the slurry (A).

By appropriately selecting the types and the ratio of the components (i) and (ii) of the retarder (b), the amounts of the retarders (a) and (b) corresponding to the ratio of the components of the aqueous slurries (A) and (B) and other conditions, an exotherm-dwell period during the initial setting stage of the rapid-hardening cement compound slurry (D) as shown by the curve A can be obtained. In other words, the specific values of these conditions are selected to realize such a setting retardation pattern.

By the term "exotherm-dwell period during the initial setting stage" is meant a period during which the progress of setting is markedly delayed or substantially stopped after a certain time has passed since the setting has started without marked delay from the time of mixing of the aqueous slurries (A) and (B). The exotherm-dwell period is visualized as a "plateau" in a temperature-time curve taken on a cement compound which is undergoing setting. In accordance with the present invention, the exotherm-dwell period can be caused to exist during a period about 2 hours after the contacting of the main hydraulic mineral component of the aqueous slurry (B) with water.

The consistency of the cement slurry during the exotherm-dwell period can be controlled to a value within a certain range. The specific consistency value is so determined that segregation of components of high specific gravity and defoaming can be prevented, and the purpose and method of the surface treatment can be realized. In the case of the surface treatment such as comparatively shallow scraping or shallow stamping, the consistency is preferably such as to show plasticity wherein jelly strength is slightly exhibited.

Retarder (a)

A component (a) of the combined setting retarders to be used in the present invention for the above mentioned purpose consists essentially of an alkali metal salt of a hydroxycarboxylic acid. The hydroxycarboxylic acid is represented by citric acid, tartaric acid and gluconic acid (particularly the former two), while the alkali metal is represented by Na and K. The retarder (a) can contain two or more kinds of the salts with respect to the hydroxycarboxylic acid and the alkali metal. These salts, however, should be soluble in the aqueous slurry (A).

The amount of the retarder (a) is approximately 0.05 to 2.0% by weight of the total powdery substances of the cement compound of the aqueous slurry (A) and the rapid-hardening cement compound of the aqueous slurry (B). The specific value is appropriately established depending on the desired setting retardation period (the more the setting retardation is desired, the more the retarder (a) should be added) and the amount of calcium aluminate contained in a given aqueous slurry (B) (the greater the amount is, the more the retarder (a) should be added).

Retarder (b)

The other component (b) of the combined setting retarders consists essentially of a combination of (i) a hydroxycarboxylic acid or an alkali metal salt thereof (especially the former) and (ii) an alkali metal salt of an inorganic weak acid. The alkali metal salt of an inorganic weak acid should be soluble in the aqueous slurry (B), and, therefore, the inorganic weak acid is represented by carbonic acid, bicarbonic acid and boric acid. The alkali metal is represented by Na and K. Representative hydroxycarboxylic acids include citric acid, tartaric acid and gluconic acid (particularly the former two). Also, two or more kinds of the components (i) and/or (ii) can be used in combination to produce the retarder (b).

The weight ratio of the components (i) and (ii) is preferably in the range of from 5:5 to 1:9. This ratio as well as the kinds of the components (i) and (ii) selected are factors which control the alkalinity of the setting retarder. An aqueous solution containing about 0.1 to 0.2% by weight of a mixture of the components (i) and (ii) within the above ratio will have a pH value in the range of, for example, 8 to 11, particularly 9.5 to 10.5. The pH value has an effect on the initial setting rating and, therefore, should be selected appropriately. The amount of the retarder (b) to be used is approximately 0.01 to 0.5% by weight of the total powdery substances of the cement compound in the aqueous slurry (A) and the rapid-hardening cement compound in the aqueous slurry (B). The specific value can be defined in the same way as described with respect to the retarder (a).

PRODUCTION OF CELLULAR CONCRETE

The process for production of the cellular concrete according to the present invention is essentially not different from a conventional prefoam process except that a rapid-hardening cement compound and the specified setting retarders are used in the present invention.

Cellular concrete having an apparent air-dried specific gravity of about 0.20 to about 1.20 can be produced by mixing aqueous slurries (A) and (B) each having respectively setting retarders (a) and (b) added with a foamed liquid (C) to produce a foamed slurry (D) of a rapid-hardening cement compound, quickly pouring the resulting slurry (D) in a mold, emplacing steel reinforcement as necessary, demolding about 15 to 120 minutes after the pouring, subjecting the molded article to preliminary hydrothermal curing, and then subjecting it to hydrothermal curing at a high temperature and a high pressure in an autoclave. The setting retarder is desirably dissolved in water in advance and then added to the slurries (A) and (B), respectively.

EXPERIMENTAL EXAMPLES (1) Aqueous slurries (A) and (B) and an aqueous foamed liquid respectively having the following compositions were prepared separately and simultaneously mixed to prepare a foamed slurry of rapid-hardening cement compound having a specific gravity of 0.80.

| (1) Aqueous slurry (A) | |
|---|---|
| regular portland cement | 100 Kg |
| silica sand powder | 100 Kg |
| water | 100 Kg |
| sodium citrate | 0.5 Kg |
| lime component | 10 Kg |
| (2) Aqueous slurry (B) | |
| alumina cement (CA 70%, $C_2AS$ 20%) | 20 Kg |
| water | 12 Kg |
| citric acid | 0.07 Kg |
| $K_2CO_3$ | 0.16 Kg |
| (3) Aqueous foamed liquid | |
| foaming agent: a foaming agent based on a protein | 15 Kg |
| gravity: | 0.05 g/cm$^3$ |

The setting pattern of the resulting mixture was the same as the curve (A) in the attached drawing. The elapse of time and the temperature of each of the three points on the curve (A) were as follows:

| $A_1$ | 15 min./25° C. |
|---|---|
| $A_2$ | 25 min./25° C. |
| $A_3$ | 30 min./30° C. |

If, to the aqueous slurry (B) having the above mentioned composition is added a setting retarder (a) such as sodium citrate, the resulting mixture will exhibit immediate setting and thus no workability. On the other hand, if, to both the aqueous slurries (A) and (B), a setting retarder (b) is added, the setting pattern of the resulting mixture approaches the curve (C). When only the aqueous slurry (A) is provided with a retarder (a) or (b), or only the aqueous slurry (B) is provided with a retarder (b), the resulting setting pattern approaches the pattern of the curve (C) or exhibits the pattern wherein the distance between $A_1$ and $A_2$ of the curve (A) becomes too short to be controlled.

(2) The above described slurry mixture was cast in a mold, demolded after 60 minutes, and then subjected to hydrothermal curing at 40° C. for 10 hours in wet air and then to high-temperature and high pressure hydrothermal curing at 180° C. under 10 atm. in an autoclave for 15 hours to produce a cellular concrete panel having an apparent air-dried specific gravity of 0.55.

What is claimed is:

1. In a process for production of cellular concrete which comprises: mixing a first aqueous slurry of a cement compound comprising calcium silicate as a main hydraulic mineral component, a second aqueous slurry of a rapid-hardening cement compound comprising calcium aluminate as a main hydraulic mineral component, and an aqueous foamed liquid to prepare a foamed slurry of a rapid-hardening cement compound; molding said foamed slurry; and then subjecting the resulting molded article to high-temperature and high pressure hydrothermal curing, the improvement wherein a first cement-setting retarder consisting essentially of an alkali metal salt of a hydroxycarboxylic acid is dissolved in said first aqueous slurry, and a second cement-setting retarder consisting essentially of a combination of a hydroxycarboxylic acid or an alkali metal salt thereof with an alkali metal salt of an inorganic weak acid is dissolved in said second aqueous slurry to provide successively an initial setting period, an exotherm-dwell period in which the setting of said foamed slurry of said rapid-hardening cement compound is substantially stopped and a subsequent setting period.

2. The process according to claim 1, in which the hydroxycarboxylic acid component of both of said setting retarders is selected from the group consisting of citric acid and tartaric acid, and the alkali metal salt of the inorganic weak acid in said second retarder (b) is selected from the group consisting of alkali metal carbonates and bicarbonates.

3. The process according to claim 1, in which the weight ratio of the hydroxycarboxylic acid to the alkali metal salt of the inorganic weak acid comprised in said second setting retarder (b) is in a range of from 5:1 to 1:9.

4. The process according to claim 1, in which the weight ratio of the chemical composition of CaO to $SiO_2$ comprised in the cement compound of said first aqueous slurry (A) is within a range of from 5:5 to 2:8, and the rapid-hardening cement compound in said second aqueous slurry (B) amounts to 3 to 30% by weight of the cement compound of the aqueous slurry (A).

5. The process according to claim 1, in which the amount of said first cement-setting retarder in said first aqueous slurry is approximately 0.05 to 2.0% by weight of the total dry substances of said cement compound of said first aqueous slurry and said rapid-hardening cement compound of said second aqueous slurry.

6. The process according to claim 1 in which the amount of said second cement-setting retarder used is approximately 0.01 to 0.5% by weight of the total dry substances of the cement compound of said first aqueous slurry and said rapid-hardening cement compound in said second aqueous slurry.

7. The process according to claim 1, in which said organic weak acid of said alkali metal salt of said second cement-setting retarder is selected from the group consisting of carbonic acid, bicarbonic acid and boric acid.

8. The process according to claim 1, in which said hydrocarboxylic acid of said second cement-setting retarder is selected from the group consisting of citric acid and tartaric acid.

9. A process according to claim 1, in which the PH value of said second cement-setting retarder is in the range of 9.6 to 10.5.

* * * * *